United States Patent [19]

Hanson

[11] Patent Number: 4,875,109
[45] Date of Patent: Oct. 17, 1989

[54] RECORD/NOT RECORD LATCH FOR RECORDING CASSETTE

[75] Inventor: Robert L. Hanson, East Bethel, Minn.

[73] Assignee: Minnesota Mining and Manufacturing Company, St. Paul, Minn.

[21] Appl. No.: 191,342

[22] Filed: May 9, 1988

[51] Int. Cl.⁴ .................... G11B 15/04; G11B 23/02
[52] U.S. Cl. ................................ 360/60; 360/132
[58] Field of Search ......................... 360/132, 60; 242/198–201

[56] References Cited

U.S. PATENT DOCUMENTS 4,320,422  3/1982  Rinkleib ........................... 360/60
4,769,732  9/1988  Tanaka ............................ 360/132

FOREIGN PATENT DOCUMENTS 0169546  7/1985  European Pat. Off. .

Primary Examiner—A.J. Heinz
Attorney, Agent, or Firm—Donald M. Sell; Walter N. Kirn; David W. Anderson

[57] ABSTRACT

A recording cassette has a latch that pivots between two positions. A plug at one extremity of the latch either blocks or unblocks a record/not record opening at an under wall of the cassette while a relatively large flange at the other extremity of the latch can either be seen or unseen at the label wall to indicate the record/-not record status. By making the latch of a color that contrasts with the label wall, mistakes in observing the record/not record status are virtually precluded.

8 Claims, 1 Drawing Sheet

RECORD/NOT RECORD LATCH FOR RECORDING CASSETTE

BACKGROUND OF THE INVENTION

1. Field of the Invention

The invention concerns a "record/not record" device for a recording cassette, specifically a device for blocking or unblocking an opening in a wall of the cassette to enable mechanism of the recorder to sense the record/not record status of the cassette.

2. Description of the Related Art

Magnetic tape cassette recorders typically incorporate a mechanism that senses whether a "record/not record" opening in a wall of a cassette is blocked or unblocked. When the opening is unblocked, the recording function is disabled, thus preventing accidental erasure. Hideaki European Pat. Publication No. 0,169,546 (filed July 23, 1985 based on a Japanese filing date of July 23, 1984) says that in prior magnetic tape videocassettes, the record/not record opening is either provided with a removable cap or is formed by breaking a partial cut-out along a weakened edge. Hideakai says that the former involves the problem of losing the cap and the latter requires something such as adhesive tape to close the opening in order to make a new recording. As Hideaki also points out, in either case it is difficult to check the recording status of the cassette, because the opening is hidden when the cassette is in position on the recorder.

Hideaki's solution to this problem is to extend the record/not record opening to the label side of the cassette and to position a slidable plug element in the opening. A coil spring biases the plug element upwardly, but the plug element can be forced downwardly and locked by being rotated 90° to close the record/not record opening. When the plug element is in the "not record" position, its upper extremity is flush with the label side of the cassette, and when the plug element is in the "record" position, its upper extremity is recessed from the label side, thus providing a visual indication of the recordability of the cassette.

Hideaki's record/not record mechanism is being used in a digital videocassette being marketed by Sony Corp. under standards promulgated by Society of Motion Picture and Television Engineers. The standards call the record/not record opening "user hole #1" and require its plug element to be seen from the label side of the cassette and to be green in color to contrast visually with the black walls of the cassette. Unfortunately, the green plug element can be seen in both positions and, upon quick inspection, a user might accidentally think that the plug is recessed when it is not, or vice versa. The Sony cassette requires a special tool to switch the plug element between its flush and recessed positions.

In a number of recording cassettes used for other purposes, a slide mounted in a wall of the cassette blocks or unblocks a record/not record opening.

SUMMARY OF THE INVENTION

The invention provides a recording cassette with a record/not record device that is interchangeable with prior recording cassettes but should be more reliable, easier to use, and less expensive to manufacture than is any prior device that indicates the record/not record status while the cassette is in place on a recorder. As required by the aforementioned specifications, the recording cassette of the invention is formed to provide a record/not record opening extending through both an under wall of the cassette and a top wall which is visible when the cassette is in place on a recorder.

The recording cassette of the invention is unique by virtue of a latch which is centrally pivotable between two positions wherein a plug at one extremity of the latch either blocks or unblocks the record/not record opening at the under wall of the cassette while the other extremity of the latch can either be seen or unseen at the opening in said visible wall to indicate the record/not record status. By making the latch of a color that contrasts with said visible wall, mistakes in observing the record/not record status are virtually precluded.

DETAILED DISCLOSURE

Because a slidable plug of the prior art is more noticeable when it indicates the "not record" condition by being flush with the label surface, the novel cassette is compatible with prior digital videocassettes when said other extremity of its latch indicates "not record" by being seen and indicates "record" by being unseen. To make it more visible, the portion of the latch that is seen preferably is large, e.g, a broad flange extending generally parallel to said visible wall of the cassette.

In a preferred cassette embodying the latch of the invention, a web extending from said visible wall of the cassette partially closes the record/not record opening, and the flange either covers or uncovers the web when the latch is pivoted between its seen and unseen positions. This provides a more finished and attractive appearance and prevents anything from accidentally falling into the record/not record opening. The exposed face of the flange is formed with a cavity into which the point of a pen or pencil can be inserted to pivot the latch.

The latch of the novel recording cassette can be molded as a single piece of plastic of a color contrasting to the color of the surrounding area of said visible wall of the cassette. To meet current specifications for digital videocassettes, the plastic should be green.

THE DRAWING

The invention may be more easily understood in reference to the drawing, all figures of which are schematic. In the drawing.

Figure 1:
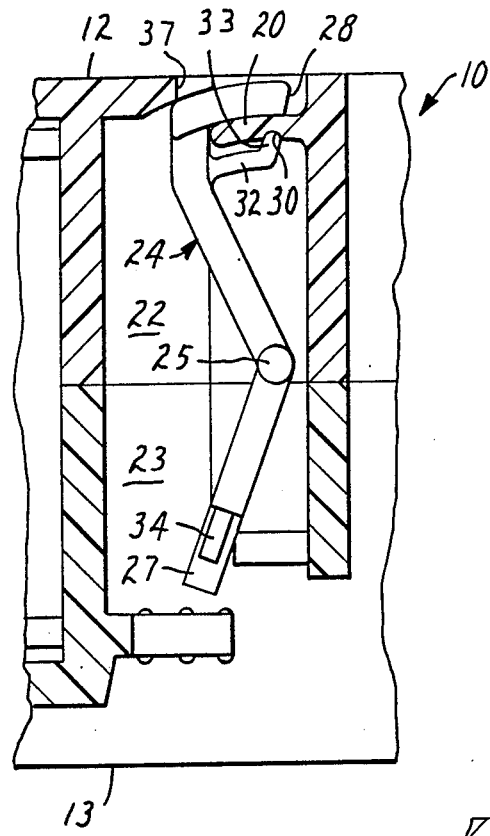
FIG. 1 is a edge view of a fragment of a digital videocassette, broken away to show a record/not record latch of the invention in the "not record" position.
Figure 3:
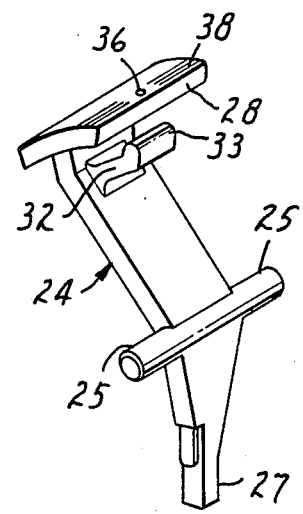
FIG. 3 is a perspective view of the record/not record latch of the videocassette of FIGS. 1 and 2.

The illustrated digital videocassette 10 has a broad top or label wall 12 which is visible when the cassette is in position on a tape recorder, and a broad under or bottom wall 13 that cannot be seen in that position. Housed side by side in the cassette 10 are a pair of tape reels (not seen) between which a record/not record opening extends through the top and bottom walls but is constricted at a slot 19 at the edge of a web 20 that is recessed beneath the top wall 12. Extending inwardly from the top and bottom walls 12 and 13 are rectangular compartments 22 and 23, respectively, the open ends of which abut to enclose the record/not record opening.

A pivotable record/not record latch 24 has a pair of central arms 25, each of which is pivotably received by a notch at the open end of the top rectangular compartment 22. One extremity of the latch 24 is a rectangular plug 27 that can block (FIG. 2) or unblock (FIG. 1) the record/not record opening at the bottom wall 13 when the latch is pivoted between its two positions. At its other extremity, the latch is formed with a broad flange 28 that extends generally parallel to the top wall 12 of the cassette. The flange 28 either covers or uncovers the web 20 when the latch is pivoted between its two positions.

Because the latch is green in color while the top wall is black, the green of the flange is visible when it covers the web 20 (as in FIG. 1) to indicate "not record," and disappears beneath the top wall of the cassette (as in FIG. 2) when the latch is pivoted, thus exposing the black color of the web 20 to indicate "record." Because "record" and "not record" are indicated by distinctly different colors (as opposed to mere differences in position of the same color in the prior art), the possibility of misreading the record status is virtually eliminated.

The underside of the web 20 is formed with a groove 30, and the latch 24 has a leaf spring 32 with an upturned finger 33 that fits into the groove when the flange 28 covers the web, thus releasably locking the latch in that position. When the latch is pivoted to retract the flange beneath the top wall 12, the finger 33 is biased by the leaf spring against the underside of the web until it moves past the edge of the web and then springs back and to a position at which it can act as a stop against accidental movement of the lever toward its "not record" position. However, the leaf spring 32 does not need to function as a stop, because this function is provided by a protrusion 34 on the plug 25 which slips into a depression in a rib (not shown) when the latch is pivoted to retract the flange. When the protrusion 34 is seated in the depression, the latch is locked against accidental movement.

The exposed or outer face of the flange 28 is formed with a cavity 36 the size of the point of a writing instrument by which the latch 24 can be pivoted between its two positions. The top wall 12 of the cassette is recessed at 37 to afford access to the cavity 36 when the flange is in its retracted position. Also formed in the outer face of the flange are striations 38 into which a fingernail can fit, thus permitting the latch to be pivoted to the "record" position without the need for any tool. However, in the "record" position, the striations 38 are hidden, thus requiring the use of a point to switch back to the "not record" position.

EXAMPLE 1

Figure 2:
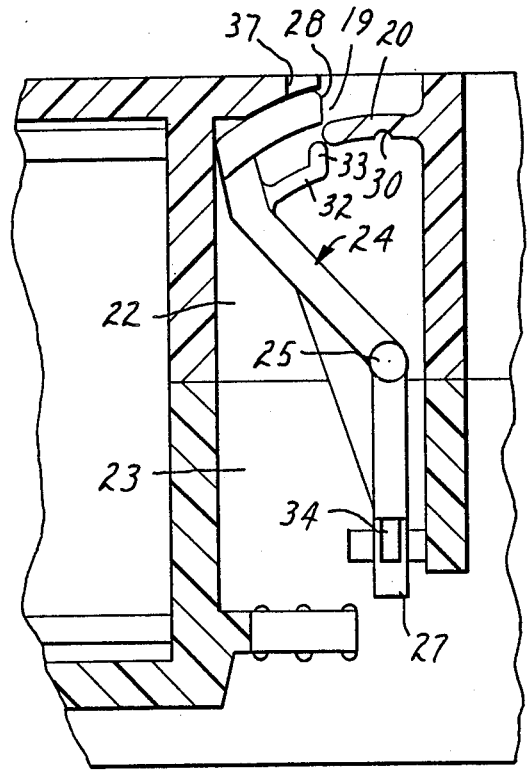
FIG. 2 is a view similar to that of FIG. 1 except with the record/not record latch in the "record" position.

The digitall videocassette 10 of FIGS. 1-2 has been constructed by molding the walls of the cassette of ABS (acrylonitrile/butadiene/styrene) resin and by molding the pivotable latch 24 of acetal resin. Key dimensions are:

Height of slot 19: 1.8 mm
Depth of web 20 beneath top wall 12: 2.9 mm
Thickness of flange 28: 1.5 mm
Depth of groove 30: 0.45 mm
Diameter of central arms 25: 1.9 mm
Thickness of leaf spring 32: 1.0 mm When in the position of FIG. 1, the leaf spring 32 and the web 20 are under very little tension so that there should be substantially no plastic flow. When in the position of FIG. 2, the only tension is between the detent 34 and the rib which should result in substantially no plastic flow. Accordingly, the latch 24 should outlast the life of the videocassette.

I claim:

1. A recording cassette formed to provide a record/not record opening extending through both an under wall of the cassette and a top wall which is visible when the cassette is in place on a recorder, a latch which is pivotable between two positions wherein a plug at one extremity of the latch either blocks or unblocks the record/not record opening at said under wall of the cassette while the other extremity of the latch can either be seen or unseen at the opening in said visible wall of the cassette, depending upon the position to which the latch has been pivoted.

2. A recording cassette as defined in claim 1 wherein the latch at said other extremity has a broad flange extending substantially parallel to said visible wall of the cassette, which flange when seen indicates "not record" and pivots beneath said visible wall of the cassette to be unseen to indicate "record."

3. A recording cassette as defined in claim 1 wherein said visible wall of the cassette has a web that partially close the record/not record opening, and said other extremity of the latch has a flange that either covers or uncovers the web when the latch is pivoted between its two positions.

4. A recording cassette as defined in claim 3 wherein the underside of the web is formed with a groove, and the latch has a leaf spring with an upturned finger that fits into the groove when said flange covers the web, thus releasably locking the latch in that position .

5. A recording cassette as defined in claim 4 wherein the exposed face of said flange is formed with a discontinuity by which the latch can be pivoted from one position to the other.

6. A recording cassette as defined in claim 5 wherein said discontinuity comprises a cavity into which a sharp point can be inserted to pivot the latch.

7. A recording cassette as defined in claim 5 wherein said discontinuity comprises striations into which a fingernail can fit.

8. A recording cassette as defined in claim 1 wherein the latch is a single piece of plastic of a color contrasting to the color of the surrounding area of said visible wall of the cassette.

* * * * *

UNITED STATES PATENT AND TRADEMARK OFFICE
CERTIFICATE OF CORRECTION

PATENT NO. : 4,875,109
DATED : October 17, 1989
INVENTOR(S) : Robert L. Hanson

It is certified that error appears in the above-identified patent and that said Letters Patent is hereby corrected as shown below:

Column 4, Claim 1, line 16, correct "nor" to --not--.

Column 4, Claim 3, line 34, correct "close" to --closes--.

Signed and Sealed this

Second Day of April, 1991

Attest:

HARRY F. MANBECK, JR.

Attesting Officer

Commissioner of Patents and Trademarks